(12) United States Patent
Feige

(10) Patent No.: US 9,391,498 B2
(45) Date of Patent: Jul. 12, 2016

(54) METHODS AND SYSTEMS FOR USE IN CONFIGURING A COIL FORMING MACHINE

(75) Inventor: Michael H. Feige, Bridgenorth (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 845 days.

(21) Appl. No.: 13/248,613

(22) Filed: Sep. 29, 2011

(65) Prior Publication Data

US 2013/0085594 A1 Apr. 4, 2013

(51) Int. Cl.
G06F 19/00 (2011.01)
H02K 15/04 (2006.01)

(52) U.S. Cl.
CPC .................... H02K 15/045 (2013.01)

(58) Field of Classification Search
CPC ..................... B21F 3/02; B21F 3/00
USPC ........................................... 700/118
See application file for complete search history.

(56) References Cited

U.S. PATENT DOCUMENTS

| 4,672,549 | A | * | 6/1987 | Saxton | 700/145 |
| 5,477,715 | A | * | 12/1995 | Kempf | 72/12.1 |
| 5,875,664 | A | * | 3/1999 | Scott et al. | 72/16.1 |
| 6,555,942 | B1 | | 4/2003 | Hsu | |
| 6,640,836 | B1 | | 11/2003 | Haubert et al. | |
| 6,758,079 | B2 | | 7/2004 | Wells et al. | |
| 7,313,264 | B2 | * | 12/2007 | Crampton | 382/154 |
| 2002/0046587 | A1 | * | 4/2002 | Hasegawa | 72/138 |
| 2003/0158620 | A1 | * | 8/2003 | Hasegawa et al. | 700/165 |
| 2008/0228454 | A1 | * | 9/2008 | Laudrain et al. | 703/7 |
| 2010/0275668 | A1 | * | 11/2010 | Riemeier et al. | 72/293 |

* cited by examiner

Primary Examiner — Mohammad Ali
Assistant Examiner — Md Azad
(74) Attorney, Agent, or Firm — Armstrong Teasdale LLP

(57) ABSTRACT

A method for configuring a coil forming machine is provided. The method comprises receiving a 3D model of a production coil, generating a 3D model of the coil forming machine, and comparing the received 3D production coil model to the 3D model of the coil forming machine to obtain a comparison. The method also includes outputting a display of the comparison and adjusting the coil forming machine in response to the comparison.

19 Claims, 9 Drawing Sheets

US 9,391,498 B2

METHODS AND SYSTEMS FOR USE IN CONFIGURING A COIL FORMING MACHINE

BACKGROUND OF THE INVENTION

The field of the invention relates generally to coil forming machines, and more particularly to methods and systems for use in configuring coil forming machines. At least some known industrial applications, such as motors, require the use of uniquely shaped coils. Known coils can vary widely, and different applications can require a near custom coil for use.

Generally, to manufacture a custom coil, a trial and error approach is taken to reproduce and replicate a known model coil. Such an approach may be a time consuming and laborious task. Moreover, because of the nature of trial and error, many coils are utilized that cannot be used. As such, the cost of fabricating known coils may be expensive.

BRIEF DESCRIPTION OF THE INVENTION

In one aspect, a method for configuring a coil forming machine is provided. The method comprises receiving a 3D model of a production coil, generating a 3D model of the coil forming machine, and comparing the received 3D production coil model to the 3D model of the coil forming machine to obtain a comparison. The method also includes outputting a display of the comparison and adjusting the coil forming machine in response to the comparison.

In another aspect, a coil forming system is provided. The coil forming system includes a coil forming machine, a scanner, and a computer comprising a processor. The computer comprising a processor is configured to receive a 3D model of a production coil, receive a 3D model of a test coil, compare the received 3D production coil model to the received 3D test coil model to obtain a comparison, and output a display of the comparison.

In an alternative aspect, one or more computer-readable storage media having computer-executable instructions embodied thereon is provided. The one or more computer-readable storage media having computer-executable instructions embodied thereon, when executed by at least one processor, cause the at least one processor to receive a 3D model of a production coil, generate a 3D model of the coil forming machine, compare the received 3D model to the generated 3D model of the coil forming machine to obtain a comparison, and output a display of the comparison.

DETAILED DESCRIPTION OF THE INVENTION

Figure 1:
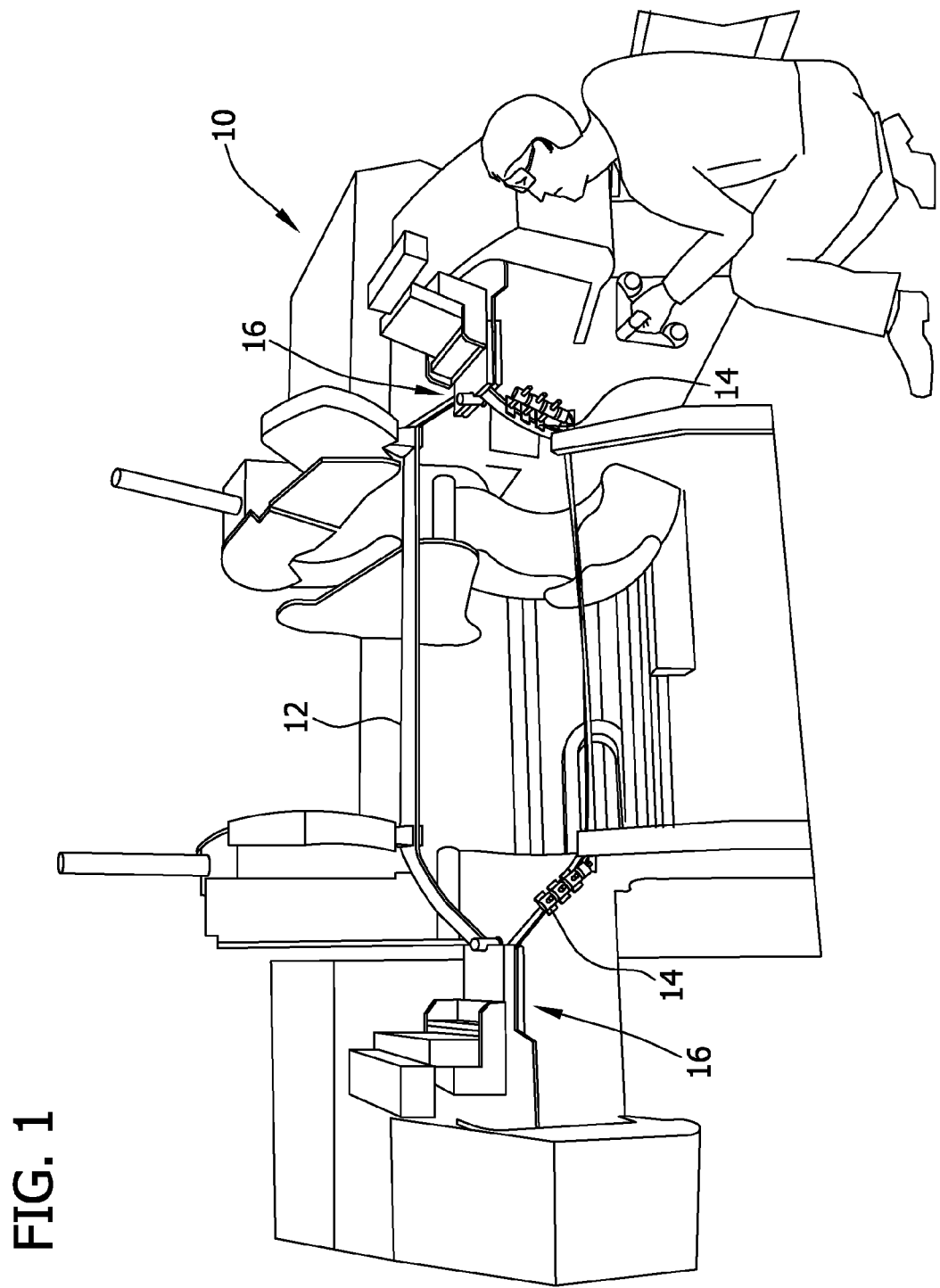
FIG. 1 is an illustration of an exemplary known coil forming machine.
Figure 2:
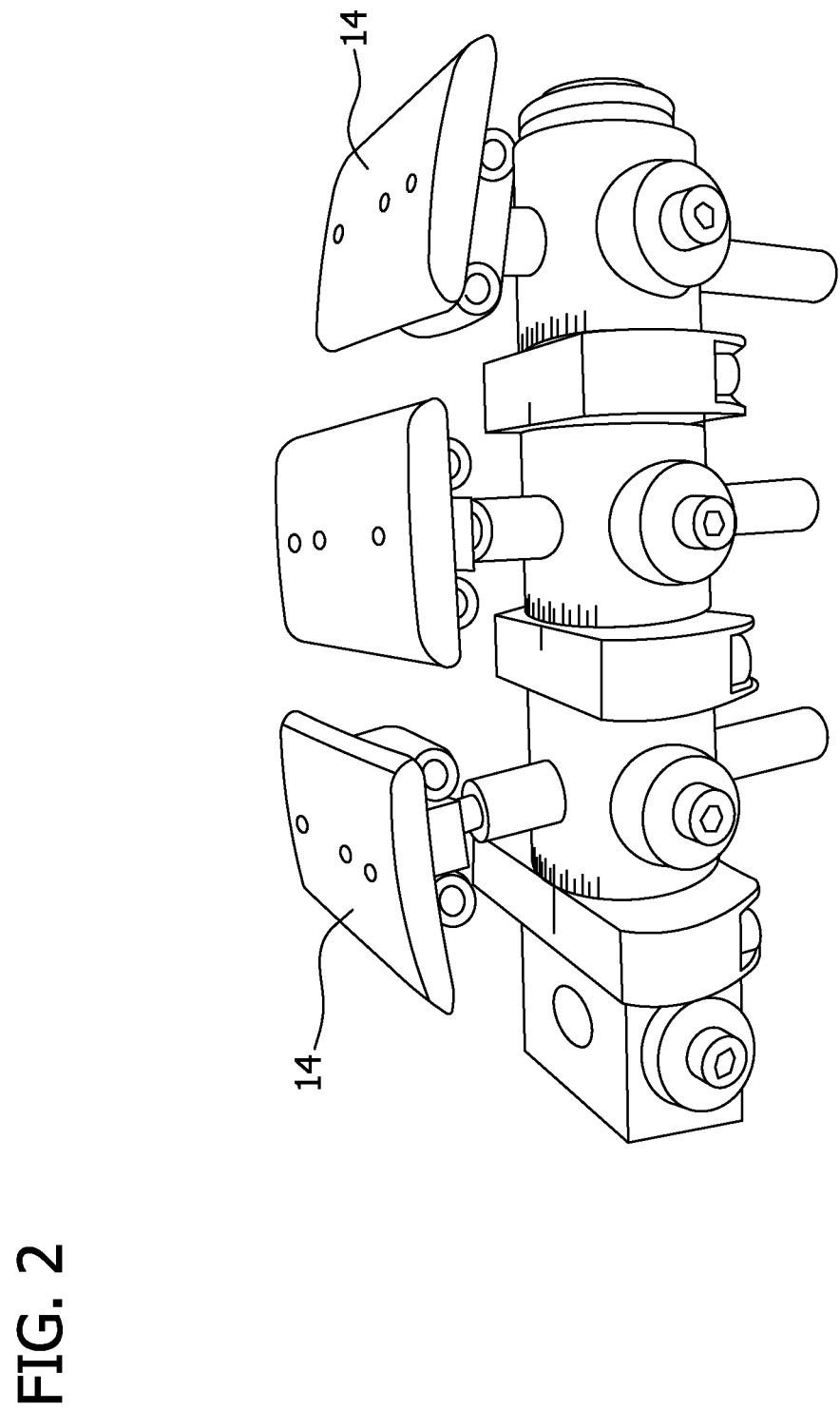
FIG. 2 is an enlarged view of exemplary coil bumpers used with the coil forming machine shown in FIG. 1.
Figure 3:
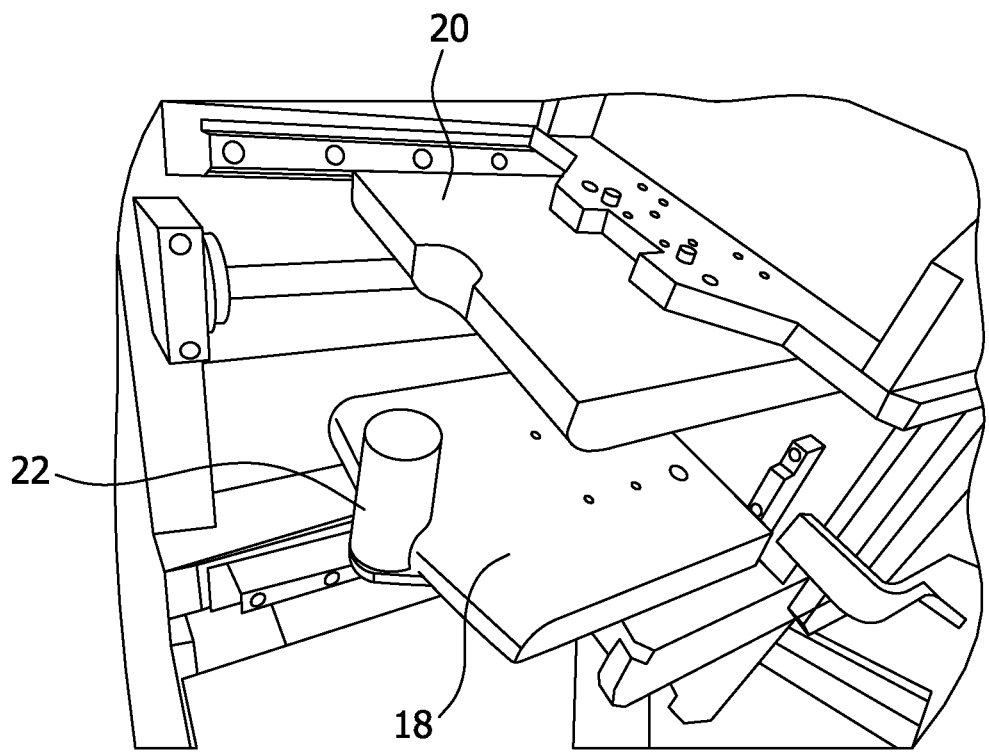
FIG. 3 is a perspective view of a coil securement assembly used with the coil forming machine shown in FIG. 1.

FIG. 1 is an illustration of an exemplary known coil forming machine 10. In the exemplary embodiment, coil forming machine 10 can produce coils or windings 12 for use in industrial applications (e.g. motors). In the exemplary embodiment, coil forming machine 10 includes coil bumpers 14 and a coil securement assembly 16. FIG. 2 is an enlarged view of exemplary coil bumpers 14 used with coil forming machine 10, and FIG. 3 is a perspective view of a coil securement assembly 16 used with coil forming machine 10. Coil securement assembly 16 includes a coil end support surface 18, a coil end press surface 20 and a coil end pin 22 for use in securing the ends of coil 12.

During manufacture, coil 12 is formed by inserting copper loops or bobbin in coil securement assembly 16 such that the loops are against coil bumpers 14. Coil securement assembly 16 retains copper loops while coil bumpers 14 are selectively moved to form the copper loops with a predetermined shape that results in coil 12.

Figure 4:
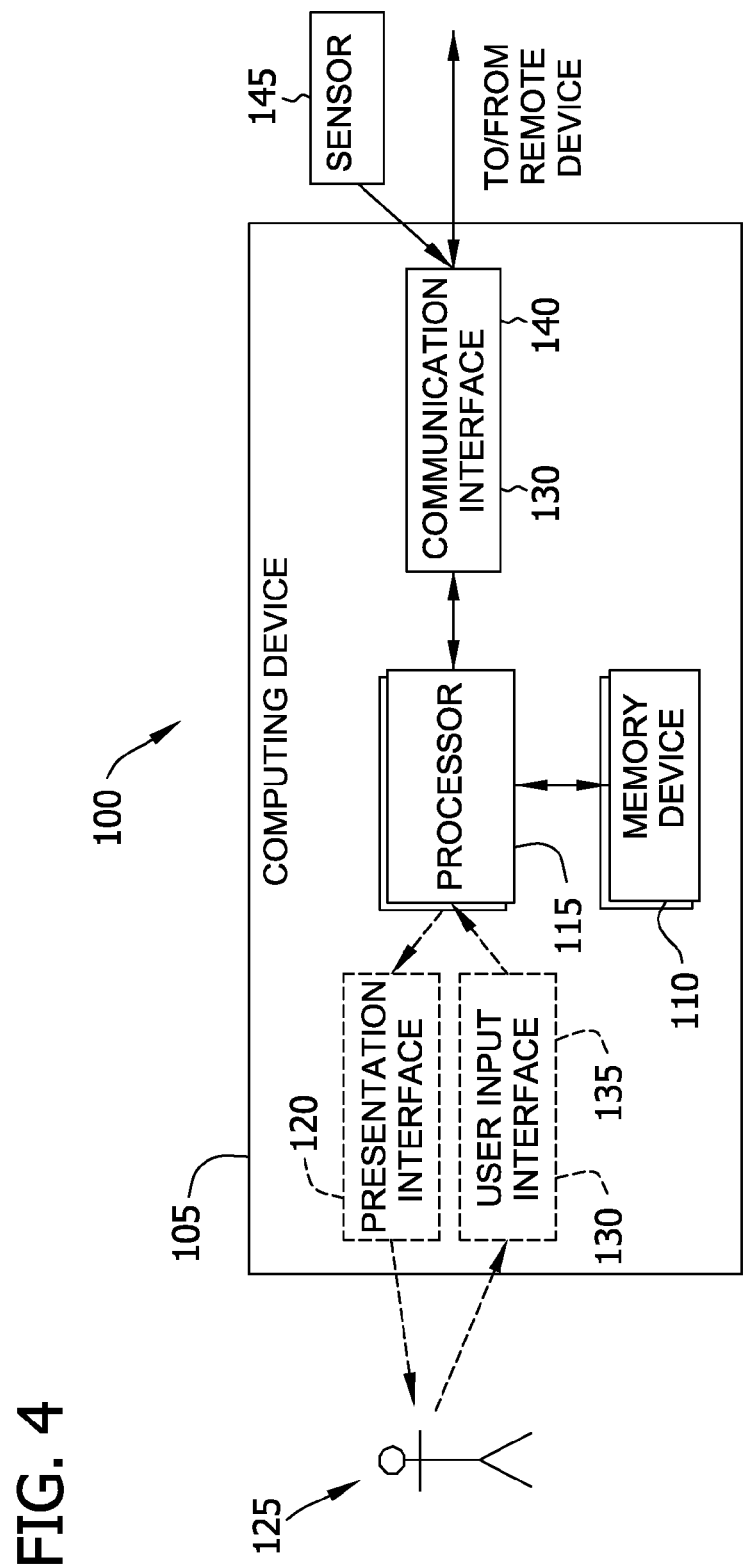
FIG. 4 is a block diagram of an exemplary computer-assisted design system that may be used with the coil forming machine shown in FIG. 1.

FIG. 4 is a block diagram of an exemplary computer-assisted design system 100 that may be used with the coil forming machine 10. In the exemplary embodiment, computer system 100 includes a computing device 105 including a memory device 110 that may be used to receive and/or send coil 12 information throughout computer system 100 or to another computer system. In the exemplary embodiment, computing device 105 includes a processor 115 that is in communication with memory device 110 and that executes programmed instructions stored or input to memory device 110. More specifically, in some embodiments, the computer-executable instructions are stored in memory device 110. Alternatively, computer-executable instructions may be retrieved from another device via a computer network. Computing device 105 is programmable to perform one or more operations described herein through programming of processor 115. For example, processor 115 may be programmed by encoding an operation as one or more computer-executable instructions and providing the computer-executable instructions in memory device 110. Processor 115 may include one or more processing units (e.g., in a multi-core configuration).

Processor 115 may include, but is not limited to, a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The methods described herein may be encoded as executable instructions embodied in a non-transitory computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term processor.

In the exemplary embodiment, memory device 110 is one or more devices that enable information, such as executable instructions and/or other data, to be selectively stored and retrieved. Memory device 110 may include one or more computer readable media, such as, without limitation, dynamic random access memory (DRAM), static random access memory (SRAM), a solid state disk, and/or a hard disk. Memory device 110 may be configured to store, without limitation, executable instructions and/or any other type of data suitable for use with the methods described herein.

In the exemplary embodiment, computing device 105 includes a presentation interface 120 that is coupled to processor 115. Presentation interface 120 is configured to output (e.g., display, print, and/or otherwise output) information, such as, but not limited to, a model of the location of the coil bumpers, securement assembly and a coil formed from the coil machine setup and a comparison of the model to a coil production requirement, to a user 125. For example, presentation interface 120 may include a display adapter (not shown in FIG. 1) that is coupled to a display device, such as a cathode ray tube (CRT), a liquid crystal display (LCD), an organic LED (OLED) display, and/or an "electronic ink" display. In some embodiments, presentation interface 120 includes more than one display device. In addition to, or in the alternative, presentation interface 120 may include a printer.

In some embodiments, computing device 105 includes an input interface 130 that receives input from user 125. For example, input interface 130 may receive a model of a coil that is to be produced or of a coil production model (e.g., a three dimensional (3D) CAD drawing/model) and/or any other information suitable for use with the methods and systems described herein.

In the exemplary embodiment, input interface 130 is coupled to processor 115 and may include, for example, a keyboard, a pointing device, a mouse, a stylus, a touch sensitive panel (e.g., a touch pad or a touch screen), a gyroscope, an accelerometer, a position detector, and/or an audio input interface. A single component, such as a touch screen, may function as both a display device of presentation interface 120 and as input interface 130.

Computing device 105 may include a communication interface 135 coupled to processor 115. Communication interface 135 is coupled in communication with a remote device, such as another computing device 105. For example, communication interface 135 may include, without limitation, a wired network adapter, a wireless network adapter, and/or a mobile telecommunications adapter.

In the exemplary embodiment, computing device 105 is coupled to a sensor 145. In the exemplary embodiment, sensor 145 is a 3D laser scanner that is used for scanning coil bumpers 14 of coil forming machine 10. For example, 3D laser scanner may be an EXAscan™ 3D scanner commercially available from Creaform, headquartered in Lévis, Canada. Alternatively, sensor 145 can be any 3D modeler or device that can provide 3D coordinates in space that enables a coil forming machine to be configured as described herein.

In an exemplary embodiment, computing device 105 stores in memory device 110, and/or is operable to access via communication interface 135 (e.g., from another computing device 105), data for use in communicating coil information. For example, such data may include, but is not limited to only including, coil production model requirements and/or variance from the production model allowances.

Figure 5:
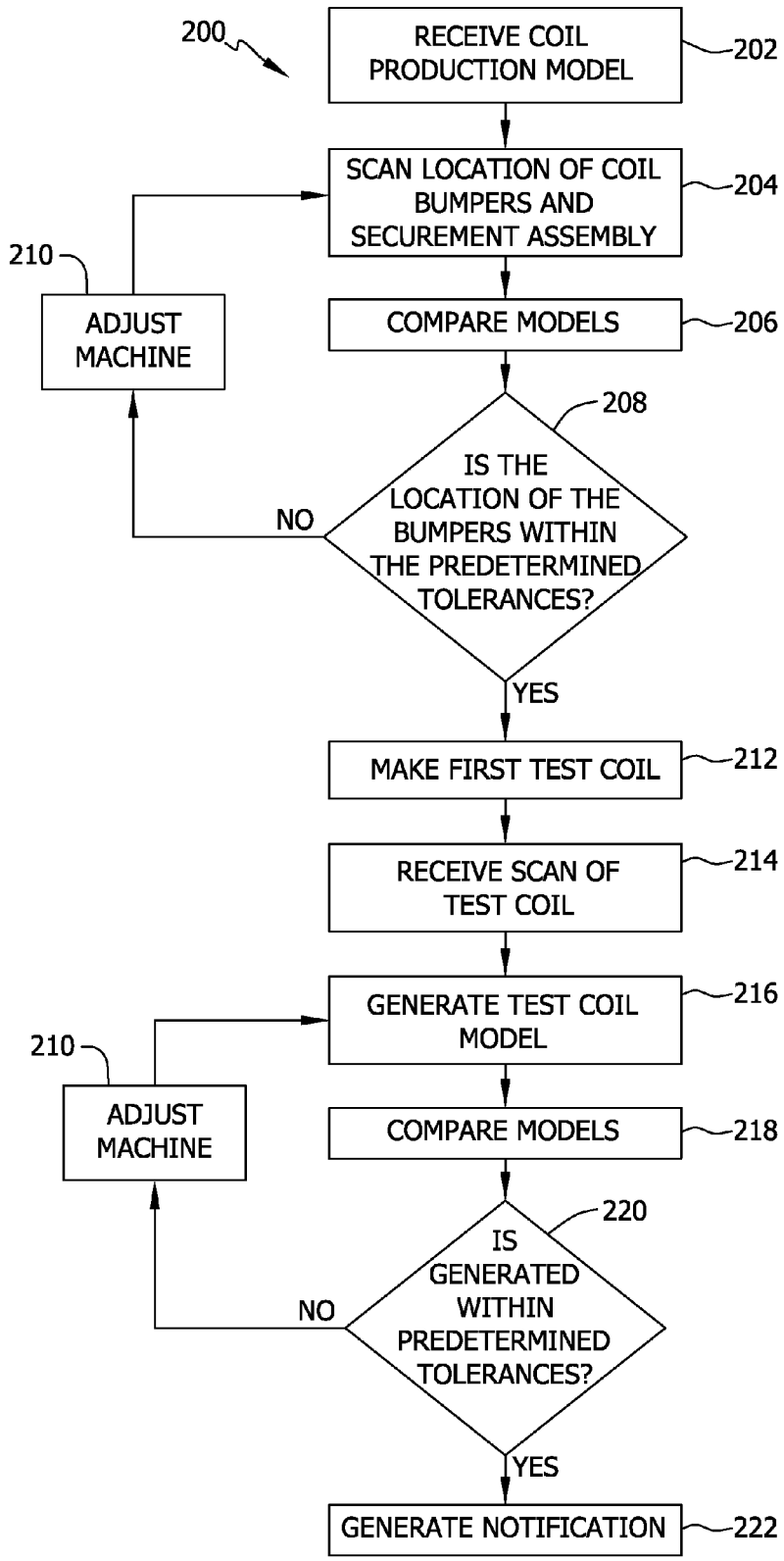
FIG. 5 is a flowchart of an exemplary method that may be used to configure a coil forming machine, such as the coil forming machine shown in FIG. 1.
Figure 6:
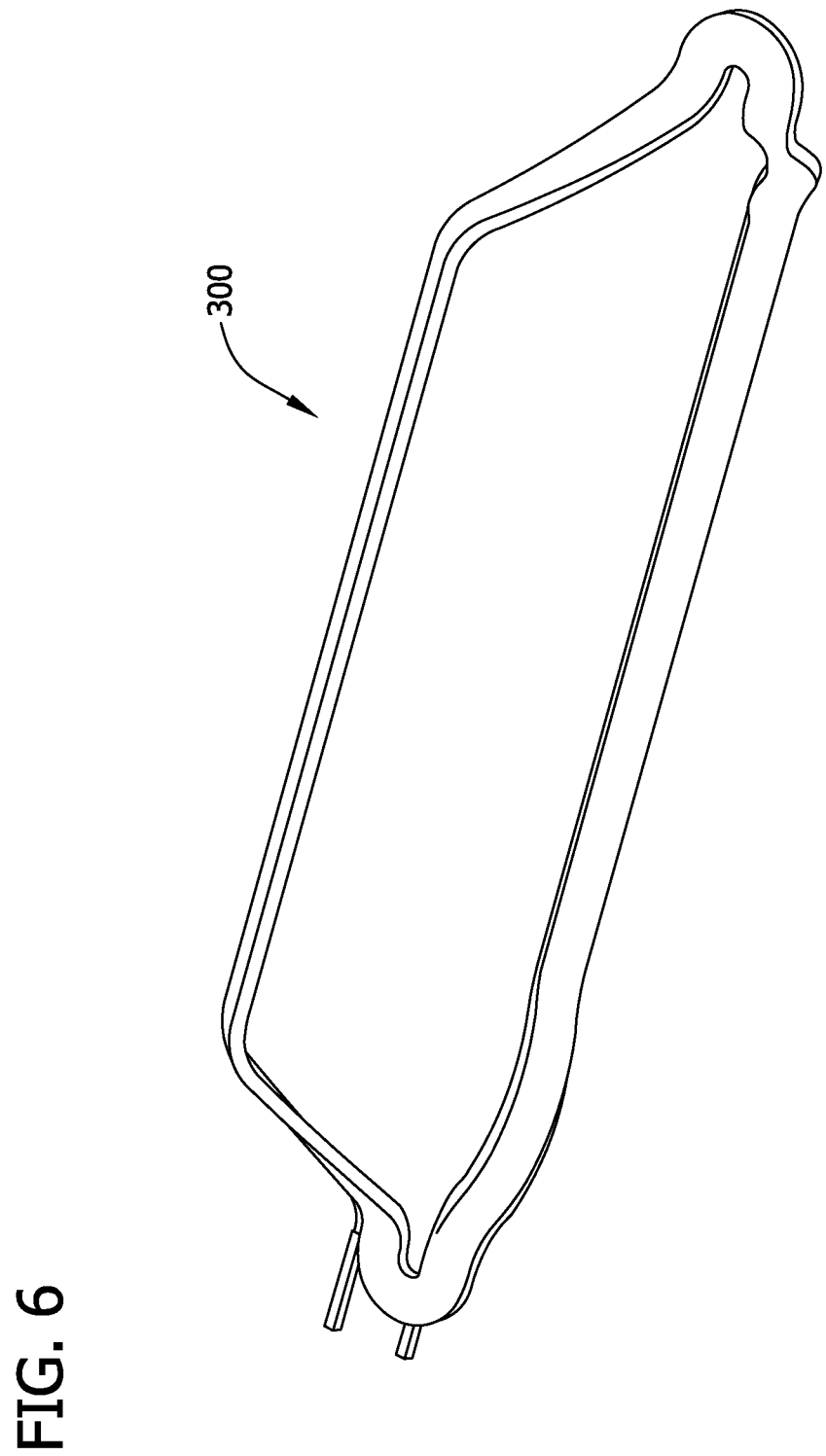
FIG. 6 is an illustration of an exemplary coil production model.
Figure 7:
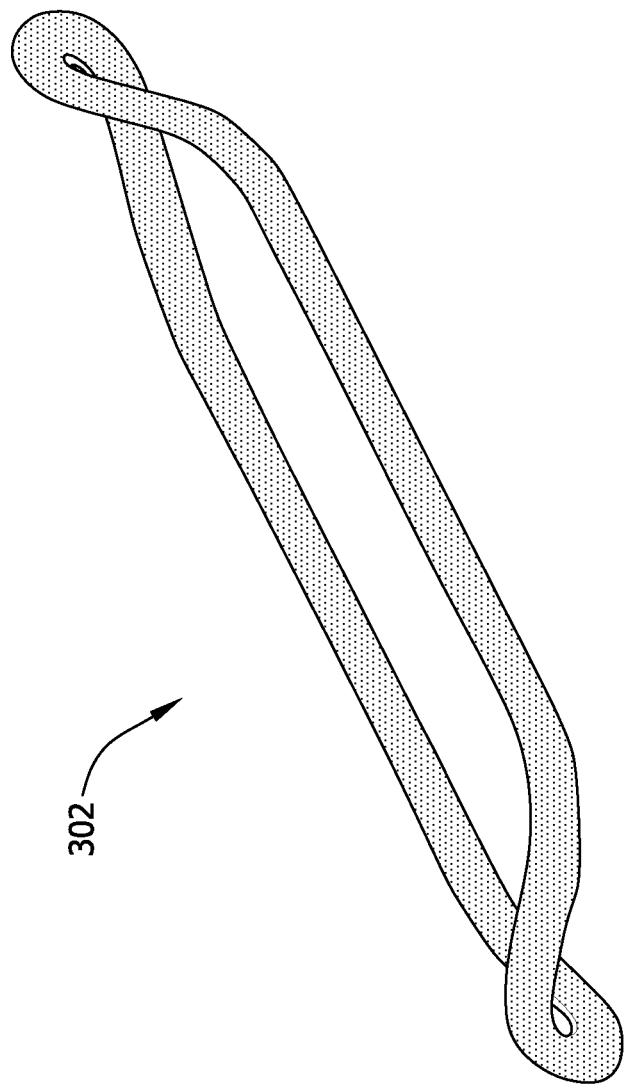
FIG. 7 is an illustration of an exemplary model of a coil produced by the coil forming machine shown in FIG. 1.
Figure 8:
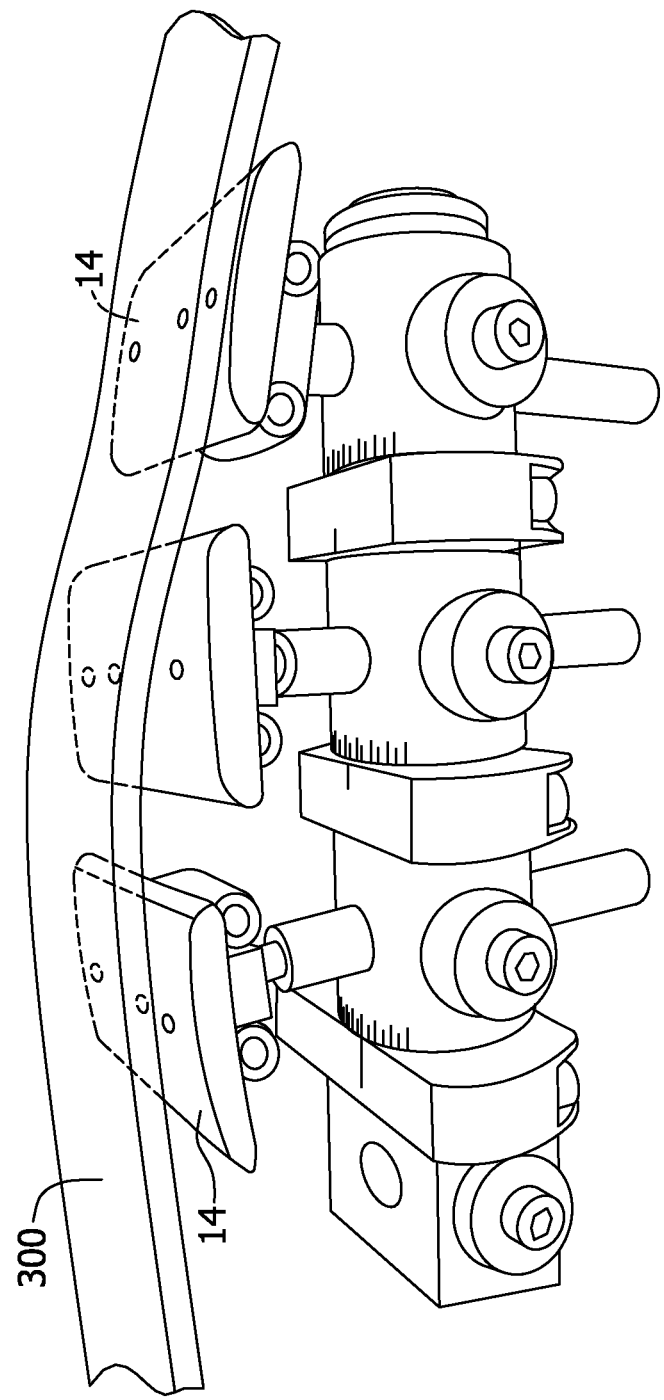
FIG. 8 is an exemplary comparison of a model of coil bumpers and the coil production model shown in FIG. 6.

FIG. 5 is a flowchart of an exemplary method 200 that may be used to configure a coil forming machine, such as the coil forming machine 10. FIG. 6 is an illustration of an exemplary coil production model 300 and FIG. 7 is an illustration of an exemplary model 302 of a coil produced by the coil forming machine 10. FIG. 8 is an exemplary comparison of a scan of coil bumpers and the coil production model shown in FIG. 6 and FIG. 9 is an exemplary comparison of the coil production model 300 and the model 302.

In the exemplary embodiment, computing device 105 receives 202 a coil production model 300. For example, in one embodiment, coil production model 300 is received 202 as a 3D CAD drawing/model. Model 300 can be received by computing device 105 including but not limited to, input interface 130, communication interface 135, and memory device 110. Alternatively, coil production model 300 can be any 3D model that enables a coil forming machine 10 to be configured as described herein. In the exemplary embodiment, a scan of coil bumpers 14 and coil securement assembly 16 is performed 204. The scan of coil bumpers 14 and coil securement assembly 16 is then input to computing device 105 such that the scanned coil bumpers are compared 206 to production model 300, as shown in exemplary FIG. 8. If model 300 is determined 208 not to be in contact with coil bumpers 14 and/or coil securement assembly 16 during comparison 206, coil machine is adjusted and the steps of scanning 204, comparing, 206, and determining 208 are continued.

When it is determined 208 that the coil bumpers 14 and/or coil securement assembly 16 would be in contact with model 300 during comparison 206, a first test coil is created 212. After first test coil is created 212, a scan is taken and received 214 of the first test coil, by computing device 105, to generate 216 a test coil model 302. In the exemplary embodiment, model 302 is a 3D model that can be compared side-by-side against the coil production model 300 previously received 202.

Figure 9:
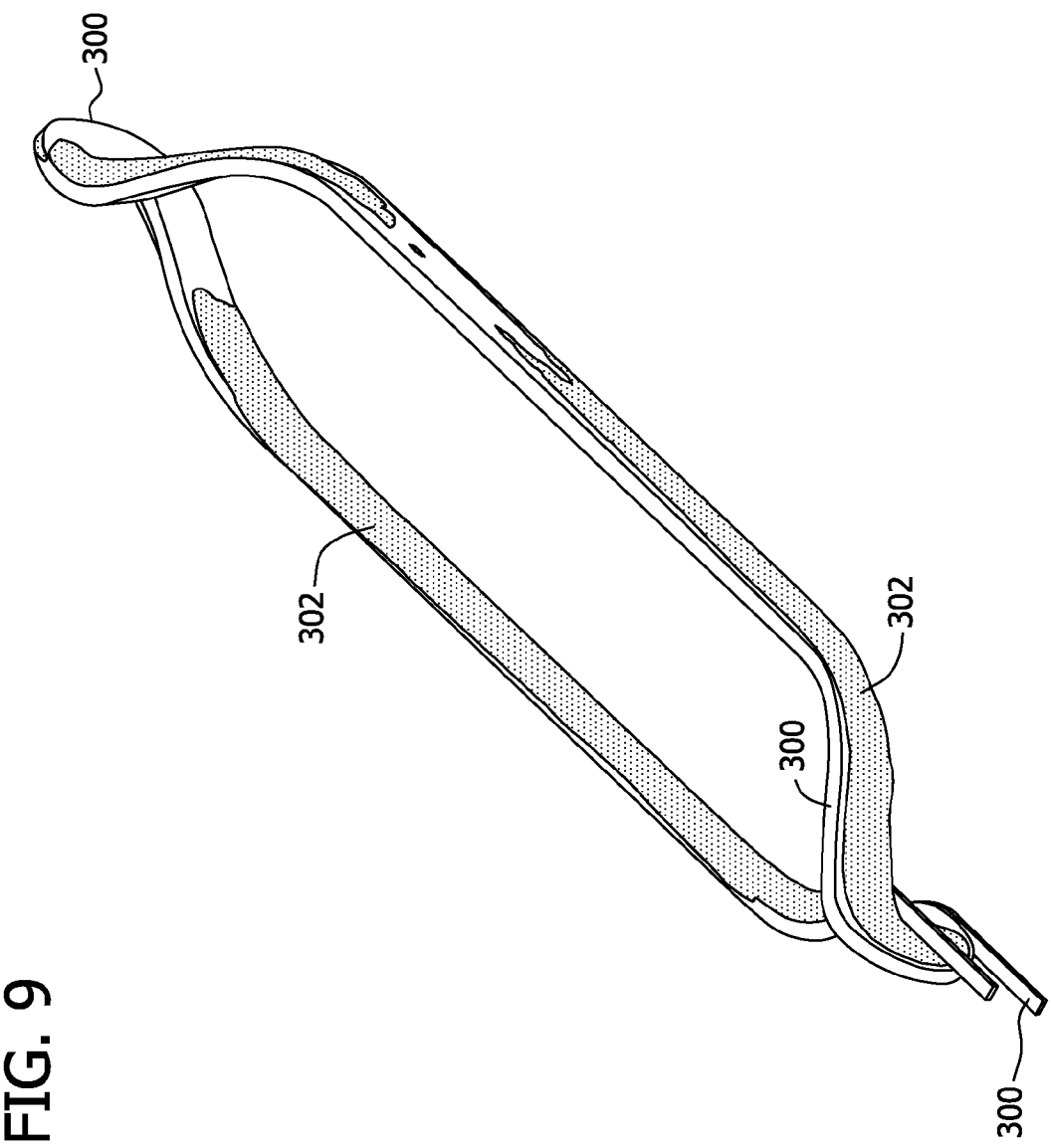
FIG. 9 is an exemplary comparison of the coil production model shown in FIG. 6 and the model of the coil shown in FIG. 7.

Computing device 105 compares 218 received 3D model 300 to generated 3D model 302 to obtain a comparison, as shown in exemplary FIG. 9. If model 300 received 202 is not within the predetermined tolerances of generated 216 model 302, coil forming machine 10 is adjusted 214. After machine 10 is adjusted 210, the steps of creating a test coil 212, receiving a scan 214, generating 216 a model 302, and comparing 218 models 300 and 302 are repeated until received 202 model 300 is within predetermined tolerances of generated 216 model 302. In one embodiment, the predetermined tolerances are in the range from +0.25 inches to −0.02 inches. In the exemplary embodiment, the predetermined tolerances range from +0.06 inches to −0.06 inches. If the received 202 model 300 is within predetermined tolerances 220 of the generated 216 model 302, then a notification is generated 222 that coil machine 10 is set up such that coil 12 replicating received 202 coil production model 302 is within the predetermined tolerances. As such, the ability to adjust 210 machine 10 prevents unnecessarily wasting coils during a trial and error setup.

The above described embodiments provide for a cost effective method for configuring a coil machine. Such a method is cost effective because it reduces the labor hours needed to create a unique coil and the amount of unusable coils is significantly if not entirely eliminated with such a method.

A technical effect of the methods, systems, and computer products described herein includes at least one of: (a) receive a 3D model of a production coil; (b) receive a 3D model of a test coil; (c) compare the received 3D production coil model to the received 3D test coil model to obtain a comparison; and (d) output a display of the comparison. Exemplary embodiments of methods and systems are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for configuring a coil forming machine, said method comprising:
   receiving a 3D model of a production coil;
   scanning the coil forming machine to generate a scan that includes at least one of one or more coil bumpers of the coil forming machine and a securement assembly of the coil forming machine;
   generating a 3D model of the coil forming machine based on the scan;
   comparing the received 3D production coil model to the generated 3D model of the coil forming machine to obtain a first comparison; and
   adjusting at least one of the one or more coil bumpers and the securement assembly of the coil forming machine based on the first comparison.

2. The method in accordance with claim 1, further comprising:
   receiving a 3D model of a test coil; and
   comparing the received 3D production coil model to the received 3D test coil model to obtain a second comparison.

3. The method in accordance with claim 2, further comprising determining if the received 3D test coil model is within a predetermined tolerance of the received 3D production coil model based on the second comparison.

4. The method in accordance with claim 3, further comprising producing a notification if the received 3D test coil model is within a predetermined tolerance of the received 3D production coil model based on the second comparison.

5. The method in accordance with claim 2, wherein comparing the received 3D production coil model to the received 3D test coil model further comprises calculating differences between the received 3D production coil model to the received 3D test coil model.

6. The method in accordance with claim 1, wherein the action includes one of overlaying the received 3D production coil model with the generated 3D model and displaying the overlay to a user; and adjusting the coil forming machine based on the first comparison.

7. A coil forming system comprising:
   a coil forming machine includes at least one of one or more coil bumpers and a securement assembly;
   a scanner configured to scan said coil forming machine;
   a computer comprising a processor configured to:
      receive a 3D model of a production coil;
      receive the scan of said coil forming machine from said scanner wherein the scan includes at least one of said one or more coil bumpers and said securement assembly;
      generate a 3D model of said coil forming machine based on the scan;
      compare the received 3D production coil model to the generated 3D model of said coil forming machine to obtain a first comparison; and
      adjust at least one of said one or more coil bumpers and said securement assembly based on the first comparison.

8. The system in accordance with claim 7, wherein said processor is further configured to:
   receive a 3D model of a test coil; and
   compare the received 3D production coil model to the received 3D test coil model to obtain a second comparison.

9. The system in accordance with claim 8, wherein said processor is further configured to:
   determine if the received 3D test coil model is within a predetermined tolerance of the received 3D production coil model; and
   generate a notification if the received 3D test coil model is within a predetermined tolerance of the received 3D production coil model based on the second comparison.

10. The system in accordance with claim 8, wherein said processor is further configured to generate information needed to adjust said coil forming machine in response to the second comparison.

11. The system in accordance with claim 7, wherein said processor is further configured to calculate the differences between the received 3D production coil model and the generated 3D model of said coil forming machine.

12. The system in accordance with claim 7, wherein the action includes one of overlaying the received 3D production coil model with the generated 3D model of the coil forming machine and displaying the overlay to a user; and adjusting the coil forming machine based on the first comparison.

13. One or more non-transitory computer-readable storage media having computer-executable instructions embodied thereon, wherein when executed by at least one processor, the computer-executable instructions cause the at least one processor to:
   receive a 3D model of a production coil;
   scan a coil forming machine to generate a scan that includes at least one of one or more coil bumpers of the coil forming machine and a securement assembly of the coil forming machine;
   generate a 3D model of the coil forming machine based on the scan;
   compare the received 3D model to the generated 3D model of the coil forming machine to obtain a first comparison; and
   adjust at least one of the one or more coil bumpers and the securement assembly of the coil forming machine based on the first comparison.

14. The one or more non-transitory computer-readable storage media according to claim 13, wherein when executed by at least one processor, the computer-executable instructions cause the at least one processor to:
   receive a 3D model of a test coil; and
   compare the received 3D production coil model to the received 3D test coil model to obtain a second comparison.

15. The one or more non-transitory computer-readable storage media according to claim 14, wherein when executed by at least one processor, the computer-executable instructions cause the at least one processor to overlay the received 3D production coil model with the received 3D test coil model.

16. The one or more non-transitory computer-readable storage media according to claim 13, wherein when executed by at least one processor, the computer-executable instructions cause the at least one processor to overlay the received 3D production coil model with the generated 3D model of the coil forming machine and displaying the overlay to a user.

17. The one or more non-transitory computer-readable storage media according to claim 14, wherein when executed by at least one processor, the computer-executable instructions cause the at least one processor to:
   calculate the differences between the received 3D test coil model and the received 3D production coil model; and
   determine if the received 3D test coil model is within a predetermined tolerance of the received 3D production coil model based on the second comparison.

18. The one or more non-transitory computer-readable storage media according to claim 15, wherein when executed by at least one processor, the computer-executable instructions cause the at least one processor to generate a notification if the received 3D test coil model is within a predetermined tolerance of the received 3D production coil model.

19. The method in accordance with claim 1, wherein the scan includes a current configuration of the coil forming machine.

\* \* \* \* \*